UNITED STATES PATENT OFFICE.

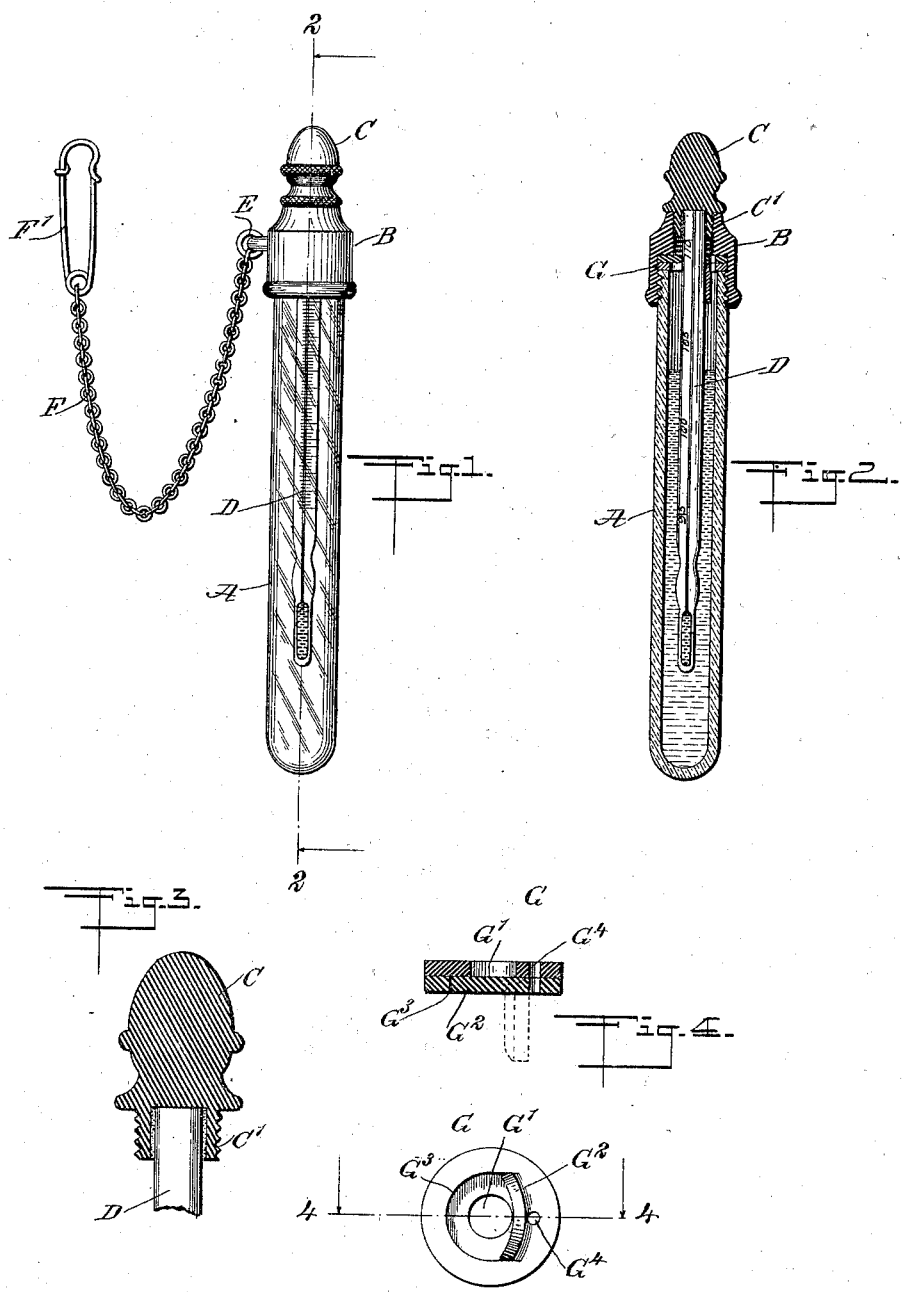

JAY FRED WINDOLPH AND RICHARD C. STOFER, OF NORWICH, NEW YORK.

CLINICAL THERMOMETER.

SPECIFICATION forming part of Letters Patent No. 702,387, dated June 10, 1902.

Application filed December 6, 1901. Serial No. 84,930. (No model.)

*To all whom it may concern:*

Be it known that we, JAY FRED WINDOLPH and RICHARD C. STOFER, citizens of the United States, and residents of Norwich, in the county of Chenango and State of New York, have invented a new and Improved Clinical Thermometer, of which the following is a full, clear, and exact description.

The object of the invention is to provide a new and improved clinical thermometer arranged to securely hold the thermometer against breakage in a casing and submerged in an antiseptic solution, to wipe and clean the thermometer on removal from or insertion into the casing, and to prevent leakage of the solution from the casing.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a transverse section of the same on the line 2 2 of Fig. 1. Fig. 3 is an enlarged sectional side elevation of the cap and the thermometer secured therein. Fig. 4 is an enlarged sectional side elevation of the diaphragm on the line 4 4 of Fig. 5, and Fig. 5 is an inverted plan view of the same.

The thermometer-casing A is preferably in the shape of a glass vessel provided on its upper open end with an external screw-thread on which screws a head B, having a screw-threaded bore in its upper end in which screws the threaded shank C' of a cap C, adapted to be seated on the upper end of the head when fully screwed down in the head. The shank C' is formed with a central bore for receiving the upper end of a clinical thermometer D of usual construction, the said thermometer being adapted to extend centrally in the casing A when the cap C is screwed in place, the main portion of the thermometer being submerged in an antiseptic solution contained in the casing, as indicated in Fig. 2. The upper end of the thermometer D is secured by cement or a like adhesive substance in the bore of the shank, as plainly shown in Fig. 3, so that the cap and thermometer are rigidly united, and the operator can readily manipulate the thermometer by taking hold of the cap without touching or rendering the thermometer unclean. By screwing the shank C' into the head B the thermometer is always held in a central position in the casing—that is, out of contact with the walls of the casing—to avoid breaking of the thermometer when inserting or removing the same. On the head B is secured a stud E, on which is fastened one end of a chain F, carrying at its other end a safety-pin F' for attachment to the vest or other part of the dress of the user to prevent loss of the casing from a pocket in the dress.

In order to wipe the thermometer perfectly clean on insertion into or removal from the casing and to prevent leakage or loss of the solution in the casing, a diaphragm G is provided, made of rubber or a like elastic and flexible material and placed over the upper open end of the casing to rest on the upper edge thereof. An annular shoulder on the head B engages the top of the diaphragm opposite the edge of the casing A, so as to securely hold the diaphragm in place over the open end of the casing, and at the same time the diaphragm forms a cushion between the said edge and the shoulder of the cap C to prevent breaking of the glass vessel when screwing up the head B. The diaphragm G is preferably made of two disks cemented or otherwise fastened together, and in the diaphragm is formed a central opening G' for the passage of the thermometer D, as plainly indicated in Fig. 2. A valve $G^2$, integral with the lower disk of the diaphragm G, normally closes the opening G', and the said valve extends into a recess $G^3$, formed on the under side of the diaphragm. When the thermometer D is inserted in the opening G' and pushed downward, the valve $G^2$ opens downwardly, and when the thermometer is withdrawn the valve closes by its own resiliency. The opening G' is preferably made somewhat smaller than the largest diameter of the thermometer D, so that when the latter is inserted or withdrawn from the diaphragm the walls of the opening G' wipe the thermometer perfectly clean, and when the thermometer has been withdrawn from the diaphragm the valve $G^2$ closes the opening G' to prevent escape or spilling of the solution in the casing A. A vent G⁴ is arranged in the diaphragm at one side of the opening G' and valve G² to allow passage of air from and to the casing A on inserting or withdrawing the thermometer G to prevent undue pressure or a vacuum in the casing.

From the foregoing it will be seen that the device is very simple and durable in construction, and the several parts are so arranged that the user of the device can readily unscrew the cap and remove the thermometer from the casing, at the same time wiping the thermometer perfectly clean of the solution and allowing the operator to place the thermometer in the proper position on the patient without being required to touch the thermometer. When the thermometer has been used, the operator can readily reinsert the thermometer by pushing the same through the diaphragm-opening back into the solution, it being understood that during this inward movement the thermometer is again wiped by contact with the walls of the opening G', and as a small amount of the solution collects in the opening when the thermometer is withdrawn and is held in the said opening by the closed valve it is evident that during the insertion of the thermometer the solution comes in contact with the thermometer to keep the same clean—that is, to prevent bacteria and the like from passing into the interior of the casing.

Having thus described our invention, we claim as new and desire to secure by Letters Patent—

1. A clinical thermometer, comprising a casing for containing an antiseptic solution, and provided with a head screwing on the open end of the said casing, a diaphragm held on the upper edge of the casing and engaged by an annular shoulder on the head to securely hold the diaphragm in position, and a cap screwing in the said head and in which the upper end of the thermometer is rigidly secured, as set forth.

2. A clinical thermometer, comprising a casing for containing an antiseptic solution, and provided with a head screwing on the open end of the said casing, a diaphragm held on the upper edge of the casing and engaged by an annular shoulder on the head to securely hold the diaphragm in position, the latter having an opening for the passage of a thermometer and a vent for the air from the casing, and a cap-screwing in the said head and in which the upper end of the thermometer is rigidly secured, as set forth.

3. A clinical thermometer, comprising a casing for containing an antiseptic solution, and provided with a head secured on the upper end of the said casing, a diaphragm held on the upper edge of the casing and engaged by an annular shoulder on the head to securely hold the diaphragm in position, the latter having an opening for the passage of the thermometer, a valve integral with the diaphragm for normally closing the said opening the valve being adapted to open downwardly on inserting the thermometer, and a cap screwing in the said head and in which the upper end of the thermometer is rigidly secured, as set forth.

4. A clinical thermometer, comprising a casing for containing an antiseptic solution, and provided with a head screwing on the open end of the said casing, a diaphragm held on the upper edge of the casing and engaged by an annular shoulder on the head to securely hold the diaphragm in position, the latter having a central opening, a valve integral with the diaphragm for normally closing the said opening and adapted to open inwardly on inserting the thermometer, the valve fitting into a recess on the under side of the diaphragm to close the opening when the thermometer is withdrawn, and a cap screwing in the said head and in which the upper end of the thermometer is rigidly secured, as set forth.

In testimony whereof we have signed our names to this specification in the presence of two subscribing witnesses.

J. FRED WINDOLPH.
RICHARD C. STOFER.

Witnesses:
 IVON W. PHILLIPS,
 CARL M. CROUP.